United States Patent
Soni

Patent Number: 6,006,330
Date of Patent: Dec. 21, 1999

[54] SECURITY DEVICE FOR RING NETWORK

[75] Inventor: Dipak Mohanlal Soni, London, United Kingdom

[73] Assignee: 3Com Corporation, Santa Clara, Calif.

[21] Appl. No.: 08/307,472

[22] Filed: Sep. 16, 1994

Related U.S. Application Data

[63] Continuation of application No. 07/952,612, filed as application No. PCT/GB92/00543, Mar. 30, 1992, abandoned.

[30] Foreign Application Priority Data

Mar. 28, 1991 [GB] United Kingdom .................. 9106675

[51] Int. Cl.$^6$ ................................................ G06F 13/40
[52] U.S. Cl. ........................... 713/201; 380/23; 380/49; 370/245; 370/452
[58] Field of Search ................... 380/23, 49; 370/94.1, 370/65.15, 452, 389, 245; 395/187.01

[56] References Cited

U.S. PATENT DOCUMENTS

| | | | |
|---|---|---|---|
| 4,752,924 | 6/1988 | Darnell et al. | 370/86 |
| 4,768,190 | 8/1988 | Giancarlo | 370/94.1 X |
| 4,901,348 | 2/1990 | Nichols et al. | |
| 4,924,460 | 5/1990 | Lubarsky et al. | 370/84 |
| 4,965,804 | 10/1990 | Trbovich et al. | |
| 4,980,913 | 12/1990 | Skret | |
| 5,124,984 | 6/1992 | Engel | 370/94.1 |
| 5,161,192 | 11/1992 | Carter et al. | 380/48 |
| 5,177,788 | 1/1993 | Schanning et al. | |
| 5,182,554 | 1/1993 | Kaiser et al. | |
| 5,311,593 | 5/1994 | Carmi | |
| 5,400,334 | 3/1995 | Hayssen | 370/85.4 |

OTHER PUBLICATIONS

Lan Security, A Business Threat from Within; by BICC Data Network Ltd., 1990.

*Primary Examiner*—Gilberto Barron, Jr.
*Attorney, Agent, or Firm*—Wilson Sonsini Goodrich & Rosati

[57] ABSTRACT

A ring data network (such as a token ring network) is divided by a security unit (1) into first and second segments (6 and 8). The second segment (8) typically corresponds to one security group in the network. Logic in the security unit reads appropriate parts of each frame (typically the two address segments) to determine whether it is appropriate to forward the frame to the next segment of the ring. If the frame does not need to go to the next segment, or is not authorized to do so, then the security unit forwards instead a modified form of the frame in which its data cannot be read (except possibly by the security unit itself). In most cases the data content of the frame will be stored in the security unit. When the modified frame returns to the security unit at its second input port (4), the original frame can (if appropriate) be reconstructed, typically by reading its data content from a store in the security unit. In this way, the frame is returned to the secure group at the same time and in the same form as if it had travelled around the first segment of the ring, but there is no opportunity for stations in the first segment to eavesdrop upon the frame.

26 Claims, 8 Drawing Sheets

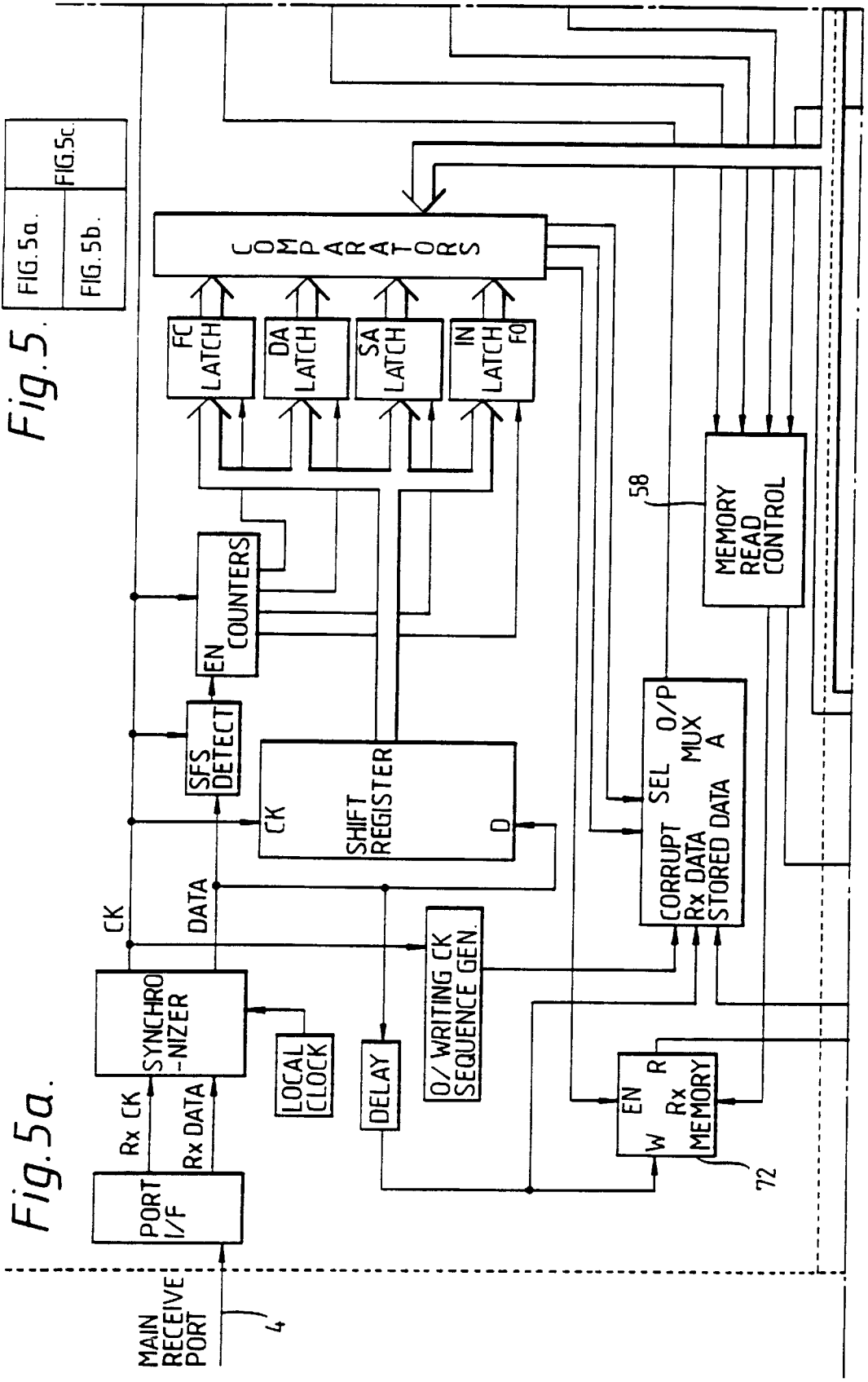

NB. THE DIAGRAM DOES NOT SHOW ALL THE CONNECTIONS AND THE QUALIFIERS SHOWN IN FIG. 5.

SECURITY DEVICE FOR RING NETWORK

This application is a continuation of Application Ser. No. 07,952,612, filed Jan. 22, 1993 now abandoned which is a 371 of PCT/GB92/00543, filed Mar. 30, 1992, now WO 9217960.

BACKGROUND OF THE INVENTION

1. Field of the Invention

This invention relates to data networks for providing communication between computers, computer peripherals and/or other digital apparatus, and more particularly to ring networks in which discrete frames of data are passed successively to each station on the network, in a predetermined order, until they eventually return to the station that originated them for removal; the stations are thus organised in a logical closed ring (which may, but is not necessarily, reflected in the physical connections). Networks of this kind in current use include the well known "token ring" networks in which access to the network is controlled by a special frame (called a "token") which must be "captured" by a station which has data to transmit and returned to the network when transmission is finished. In some networks (depending on the network protocol) a station holding the token may continue transmitting (or wait) until its own first frame returns to it; in others it may transmit only one frame before returning the token.

2. Description of Related Art

There are obvious security risks in a network in which all the data passes through every station, and it is an object of the invention to permit the construction of networks which retain the essential characteristic of ring networks (so that standard token ring stations, for example, can be used) and yet in which a data frame can be read only by a station to which it is addressed or at least only by stations in the same security group, and/or which is authorised to receive it.

SUMMARY OF THE INVENTION

The invention provides a security unit for use in a ring network and includes networks in which at least one such unit is used and a method of operating such a network.

In accordance with the main aspect of the invention, a security unit for a ring network has two pairs of ports, each pair comprising an input port for receiving data frames from the ring and an output port for forwarding data frames to the ring, so that it may be connected into the ring in two positions so as to divide the ring into a first segment downstream of the first pair of ports and a second segment downstream of the second pair of ports, each said segment containing at least one station, and is characterised by means for reading a part of each data frame received at its input port (the "original" frame) and determining from that part of the frame (in conjunction with stored data) whether the frame is addressed to and/or authorised to be received by a station in the said first segment; means for modifying the frame into a form in which its data content cannot be read and for forwarding the modified frame to its first output port, instead of the original frame, if it is not addressed to such a station or is not authorised to be received by any such station; and means for reconstructing the original frame and transmitting it from its second output port when the modified frame is returned to the security unit by the said station. Frames that were modified because they were not addressed to a station in the first segment will always need to be reconstructed, and in this case the security unit thus returns the frame to the second segment of the ring in substantially the same form and at substantially the same time whether it has been passed to the first segment of the ring or not, and the operation of the ring is otherwise unaffected. Any frames that were modified because they were unauthorised may also be reconstructed, and in some network protocols this may be essential (for instance because the frame will circulate indefinitely if it is not recognised and removed by the station that originally transmitted it). Otherwise it may be transmitted to the second segment of the ring in its modified form or reconstructed with other alterations (for instance by substituting for its destination address that of a security monitoring station in the second segment).

The frame may be modified by encrypting it and restored by decrypting it according to a code which only the security unit "knows"; but we much prefer to modify it by substituting some other data for all or at least a major part of the data contained in the original frame while holding the original frame (or at least the data contained in it) in memory in the security unit, and to restore it by reading from that memory.

The substitute data in a modified frame need be no more than a string of 0's or 1's or a random sequence of digits; or it may be (or may include) meaningful data read from memory in the security unit and enabling it (and suitably-programmed stations) to identify that the frame has been modified for security reasons and/or to identify the individual modified frame. In networks in which the protocol requires an end-of frame segment including a parity bit it may be desirable to recalculate the parity bit in order to avoid the modified frame being logged as an "error" frame; in some network protocols it may be an acceptable alternative to suppress the end-of-frame segment altogether so that the modified frame will be treated as a "fragment" and not as a data frame at all.

Ideally a modified frame contains none of the data of the original frame (except possibly in encrypted form); however, if delay requirements make this difficult, it will usually be acceptable for the first few bits of the data to be incorporated in the modified frame.

In some ring networks protocols, a frame is altered by writing an acknowledge signal into it when it is read by the station to which it is addressed and will not be removed from the ring by the originating station (or if removed will be re-transmitted after an interval) until it has been so altered; in such a ring network, a security unit which detects a frame that is addressed to a station in its first segment but which that station is not authorised to receive should reconstruct the frame with the acknowledge signal written into it in order to stop the frame from recirculating indefinitely; for the purpose of this application a frame altered in this way (or more generally any frame containing the same address and data content) is considered as still the "original" frame.

In a major application of the invention, several stations are connected to the second segment of the ring and constitute a single security group; in this case frames addressed by one station in the security group to another station in the same security group are modified by the security unit and thus protected from eavesdropping by any station outside the security group. This is appropriate for a network in which only a minority of stations handle secret or confidential data, and requires a security unit only for (each of) the security group(s) to which those stations are allocated.

In another application of the invention, stations constituting a single security group are connected in the first segment of the ring and stations not belonging to that security group in the second segment. This is appropriate when a large proportion of the stations are handling secret or confidential data of different classes and offers the possibility for frames to be passed from one security group to another without making them accessible to eavesdropping in any security group except the one to which they are addressed (and probably the one in which they originated). It does, however, require that every station is allocated to a security group and that every security group is provided with a security unit as described. Both these facilities can be provided by use of security units that are symmetrical or otherwise process as described frames received at either the first or the second input port.

Either or both of the first and the second segment may be subdivided by additional security units of any of the forms described, down to a maximum-security network in which every security group has a security unit and every individual station has its own security unit so arranged that no frame that is addressed to a station within the same security group that originated it is ever passed to the segment of the ring outside that security group and within a security group no frame is ever passed to any station except the one to which it is addressed and (if required) the one that originated it.

The ring connection defined may be physical or only logical, and in the latter case appropriate adjacent ports may be combined into single bidirectional ports. Further, security units can be integrated with one another and/or with "concentrators" providing facilities (in a known way) for connecting a plurality of stations (usually the stations of one security group) into the ring.

If the network needs to be secured only against eavesdropping (that is the reading of frames by a station to which they are not addressed) then it may be sufficient for the security unit to read the destination address segment of each incoming frame and compare it with stored data indentifying station(s) connected-to the next segment of the ring (that is the first segment if the incoming frame arrives at the first input port or the second segment if it arrives at the second input port); if the destination address matches a/the stored address, the original frame is forwarded, otherwise a modified frame.

In a network with a protocol that requires frames to be returned intact to their source station for removal, it will also be necessary for the security unit to read the source address in each frame, and to modify it only if neither the destination address nor the source address matches a/the station connected to the next segment of the ring.

If security is also required against unauthorised messages, then the security unit must always read both the destination address and the source address of each frame and must store and refer to access rules indicating which sources are authorised to communicate with the station(s) connected to the next segment of the ring; subject to the preceding paragraph, only if the destination address is matched and the source address corresponds with the access rule for that destination address is the original frame forwarded.

A security unit may need to store simultaneously a number of original frames (or their data content). It is not strictly necessary to use any system of address marking since in the nature of a ring network frames cannot change order, so that the first frame stored is always the next to be read. Preferably, however, each modified frame includes an identifier (e.g. a sequential number) enabling a correct match with its original frame to be confirmed, as a precaution against the possibilities of a modified frame being "stolen" by a station or otherwise lost from the network or of a station itself modifying an original frame before re-transmitting it or inserting an additional frame that appears to the security unit to be a modified frame. If this is not done, then it is desirable to write the complete original frame to memory, allowing identification to be confirmed at least to the extent of destination address or at the very least allowing the whole frame to be re-transmitted from memory as received to eliminate the risk of a security failure occurring due to a reconstruction error that assembles data with the wrong destination and/or source address.

Obviously the token (in a token ring network) and any other special management frames will need to be recognised and forwarded without being modified; and if the modified frames are not identifiable as such by their content (e.g. if the whole data field is randomised) and have to be identified on the basis of transit time, allowance will have to be made for the time taken to insert new frames when the system protocol allows (e.g. in front of the token in a token ring).

Data for comparison (station address and/or access rules) may be written to the security unit in any appropriate manner. For maximum security against unauthorised alteration, they could be pre-programmed in ROM; or they could be written by a special plug-in unit (such as a keyboard or a mobile memory device) afterwards removed; or they could be communicated via a separate, secure network for the purpose (another ring network, a random access network, or some kind of switched network); or they could be written using network management frames, provided the possibility that management frames will be counterfeited can be discounted; or for a minimal system checking only destination addresses, they could be "self-learned" during ring initialisation.

BRIEF DESCRIPTION OF THE DRAWING

The invention will be further described, by way of example, with reference to the accompanying drawings in which

FIGS. 5, 5A, 5B and 5C are a block diagrams illustrating one embodiment of this form of the invention.

DETAILED DESCRIPTION

Figure 1:
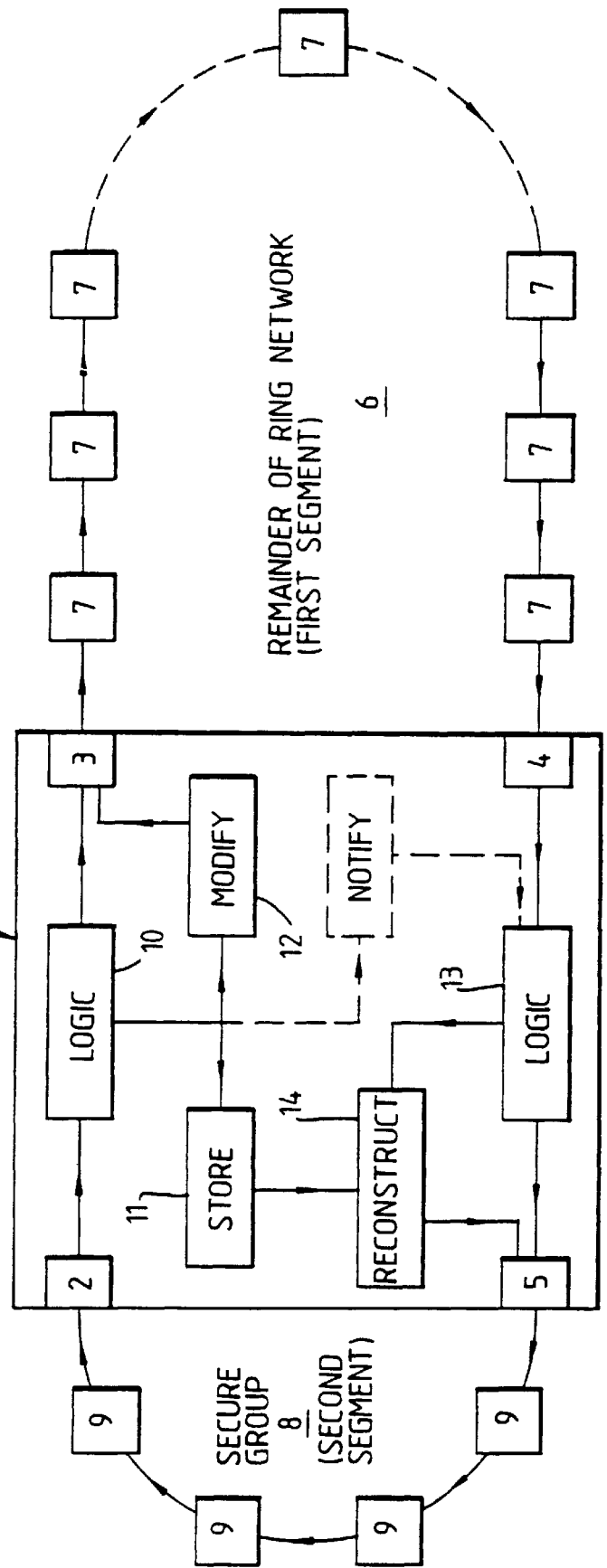
FIG. 1 is a diagram illustrating a basic form of the invention.

FIG. 1 represents the application of the invention to a very simple and basic token ring network with a protocol such that an originating station will remove its frames, after they have passed around the ring, on the basis of the address information only, without reference to the data content, and which includes only one group of users requiring security in the sense that frames both originating in and addressed to the secure group must be protected from eavesdropping by stations outside the secure group but not from stations within it.

In accordance with the invention, the network includes a security unit 1 having a first (upper) pair of ports comprising a first input port 2 and a first output port 3 and a second (lower) pair of ports comprising a second input port 4 and a second output port 5. This is connected in two separate places in the ring so as to partition it into a first segment 6 containing all the stations 7 that are not members of the secure group and a second segment 8 containing those stations 9 which do belong to the secure group. The stations 7 and 9 can be entirely conventional token ring stations.

Frames received on the first input port 2 are, in this basic form to the invention, analysed simply to determine whether the destination address in the frame corresponds to one of the stations 9 in the secure group, or not. If it does not, the frame is simply passed to the first output port 3 and thence continues around the ring in the usual way. If the destination address does belong to the secure group, then the frame is written by the logic device 10 into a data store 11, which operates on a first-in-first-out basis and preferably has a capacity of several frames; a modified version of the frame is generated as already described, containing the same destination and source addresses and a data content sufficient to enable the frame to be recognised by the security unit as being one that it modified; the modified frame is passed sequentially to all of the stations 7, which since it contains none of the original data content cannot eavesdrop upon it, and eventually returns to the security unit at its second input port 4, which passes it to a logic device 13 which determines simply whether this is a frame that was modified by the security unit or not (this decision may be based solely on the content of the frame, but if desired a decision to modify a frame can be notified by logic 10 to logic 13); if it was not, the incoming frame is immediately passed to the second output port 5 and thus continues around the ring; if the frame is one that was modified by the security unit, then instead the frame is reconstructed (reference 14) by reading it from the store 11 (where it will always be the frame that has been longest in the store, and therefore automatically be the next one to be read) and the reconstructed frame passed to the second output port 5 and thence to the station 9 in the secure group. Thus the stations 9 in the secure group can communicate with each other with the same security as if the stations 7 were not in the ring, and at the same time the stations 9 can communicate with the stations 7 (and vice versa) through the same ring network.

Figure 2:
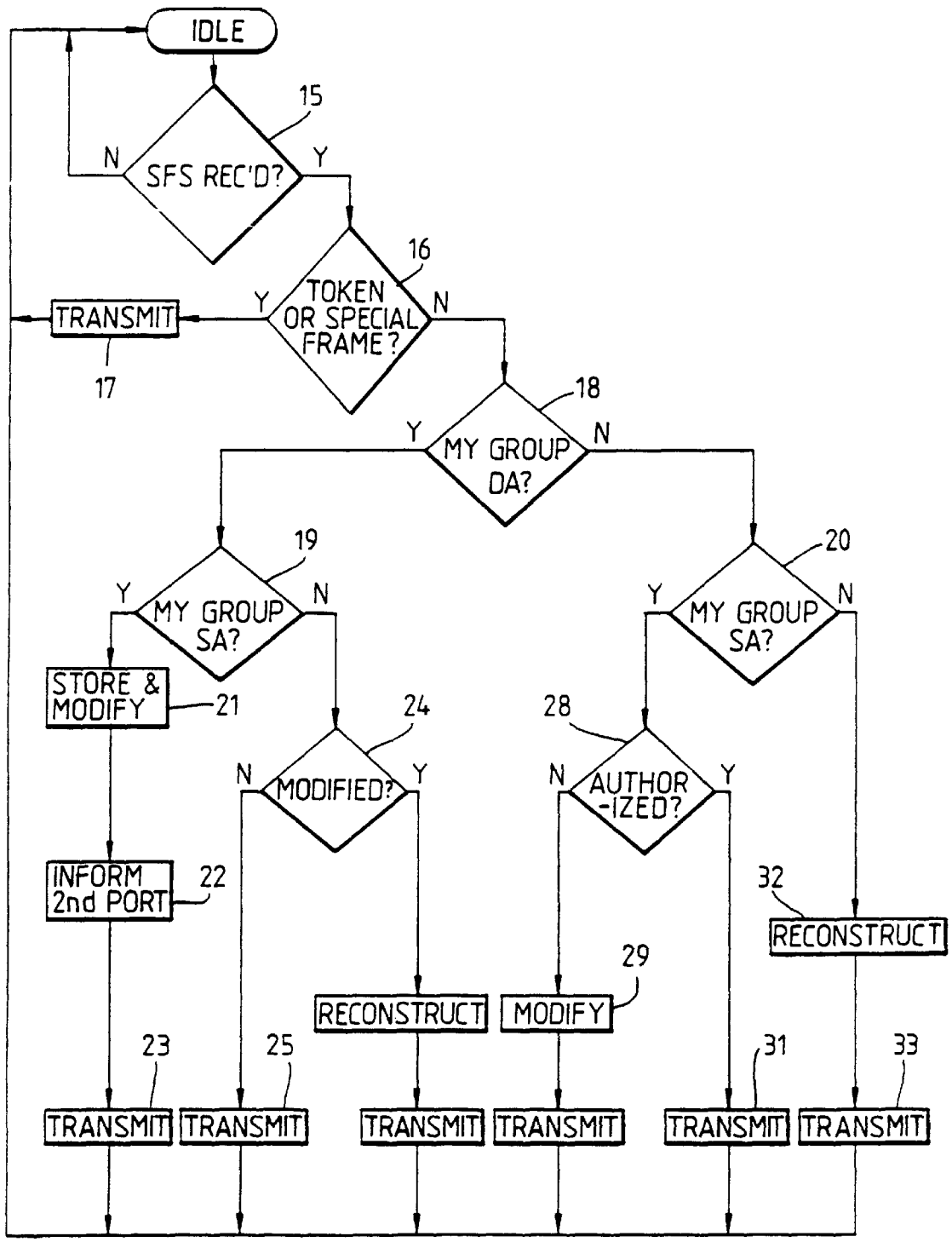
FIGS. 2 and 3 are logic diagrams relating to a somewhat more developed form of the invention than is shown in FIG. 1, FIG. 2 relating to the processing of frames arriving at the first input port and FIG. 3 to those arriving at the second input port.
Figure 3:
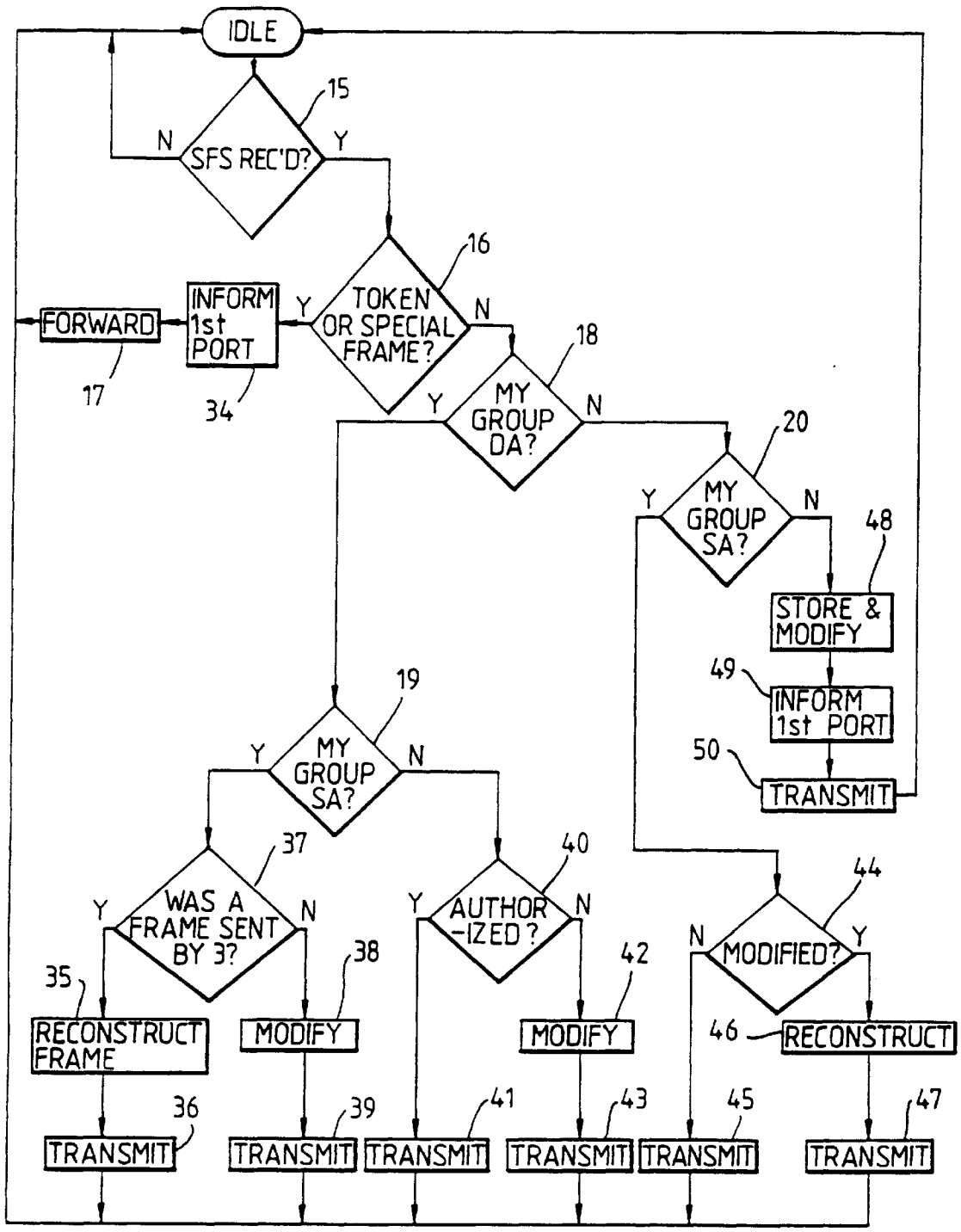

FIGS. 2 and 3 are decision diagrams for the logic units for the first and second input ports respectively (corresponding to logic 10 and logic 13) for a slightly more developed form of the invention using the same basic circuit layout as shown in FIG. 1 but providing additional security.

Referring first to FIG. 2, in its "idle" state the logic repeatedly determines whether a s tart of frame sequence (SFS) is being received at its port (decision 15). If not, it remains in the idle state, but if so it next determines (decision 16) whether the frame being received is a token or other special frame; if yes, then it immediately transmits it (step 17) to the first output port 3. If it is not but is an ordinary data frame, it next determines (decision 18) whether the destination address (DA) of the frame corresponds to one of the stations of its own, secure, group. In this case, the ring protocol requires frames to be returned to the source station for removal with the same data content as they originally had and the logic therefore needs to distinguish between "secure" frames at both originate and are addressed to stations 9 in this secure group and "insecure" frames that were addressed to stations 9 within the secure group by stations 7 outside it, as the latter need to be returned to the first segment of the ring in order to reach their originating stations and be removed. Whichever way decision 18 goes, therefore, the next decision (19 or 20), is whether the source address (SA) corresponds to one of the stations 9 or not. Taking the four possibilities from left to right in the diagram, if both the destination address and the source address belong to stations 9, then the frame is a secure frame that should not be transmitted to the first segment 6 and the decision is therefore made to store the frame and generate a modified version of it (step 21). This decision may be reported, if required, to the logic for the other input port (step 22) and the modified form of the frame is transmitted (step 23) to the output port 23.

If the destination address corresponds to one of the stations 9 but the source address does not, then the frame is necessarily one that has already been processed before it entered the second segment 8 by logic 13, which will have made a decision (as described below) whether it was authorised or not. Logic 10 therefore only needs to determine whether the frame is one that was modified by logic 13 or not (decision 24); if it was not modified, then it can be immediately transmitted from first output port 3 (25), but if it was modified then the decision needs to be reconstructed (26) by taking at least its data content from a store in which it was place by the logic 13 before it is transmitted (27).

If at decision 20 it is determined that although the destination address does not correspond to one of the stations 9 the source address does, then the frame is a new one inserted by one of the stations 9 and not so far examined by the logic 13. Logic 10 therefore needs to determine whether the frame is authorised or not (28) by reference to its stored access rules. If it determines that it is unauthorised, then the frame is modified (29) and if the ring protocol requires is stored in its original form; the modified frame is transmitted from port (30). If it determines that the fame is authorised, then it is immediately transmitted (31).

If neither the destination address nor the source address corresponds to any of the stations 9, then the frame will have been modified by the logic 13 and it is again necessary to reconstruct it (32) before it is transmitted (33) from the output port 3.

Referring now to FIG. 3, logic steps 15 to 20 at the second input port are formally the same as at the first input port (but note that the security group concerned is still the same one, which is now the downstream rather than the upstream part of the ring); the facility to inform the logic 10 at the other input port (34) is optional.

If both the destination address and the source address correspond to station 9, then the presumption is that the frame is a frame that was modified by the logic 10 and now needs to be reconstruction (35) and transmitted (36) from the second output port 5. There may however be a risk that a station is "masquerading" by transmitting frames showing a source address other than its own, and if it is desired to provide protection against this possibility, then an additional logical decision 37 is inserted in the tree simply to determine whether the frame was transmitted from the first output port 3. A masquerading frame would not have been, and in that case the appropriate action is to modify the frame (38), and store its data content if necessary, before it is transmitted (39) from the second output port 5.

If the destination group corresponds to one of the stations 9 but the source address does not, then the frame is a new frame inserted by one of the stations 7, and the logic needs to refer to its stored rules to determine whether the frame is authorised or not (40); if it is, it is immediately forwarded (41); otherwise it is modified (42), and its data content stored if the ring protocol requires it, before being transmitted (43); if the destination address does not correspond to one of the stations 9 but the source address does, then the frame is one that has already passed through the logic 10 which will have modified it if it was unauthorised. Logic 13 therefore determines whether it has been modified or not (44) and if has not it is transmitted (45) from port 5. If it has been modified, then (assuming the ring protocol requires it) it will be reconstructed (46) before being transmitted (47) in order that the originating station will recognise and remove it.

Finally, if neither the destination address nor the source address corresponds to any of the stations 9, the frame will be modified and its data content stored (48) and the logic 10 of the other port informed before the frame is transmitted (50) from the output port 5.

As so far described with reference to FIGS. 1–3, only the stations 9 in the second segment (8) of the ring constitute a secure group. If desired, the stations 7 in the first segment (6) could be constituted into a second secure group by adding logic at the first input port 2 so as to make it identical with the second input port 4 (that is by amending FIG. 2 to make it identical with FIG. 3, except for some of the numerals).

Figure 4:
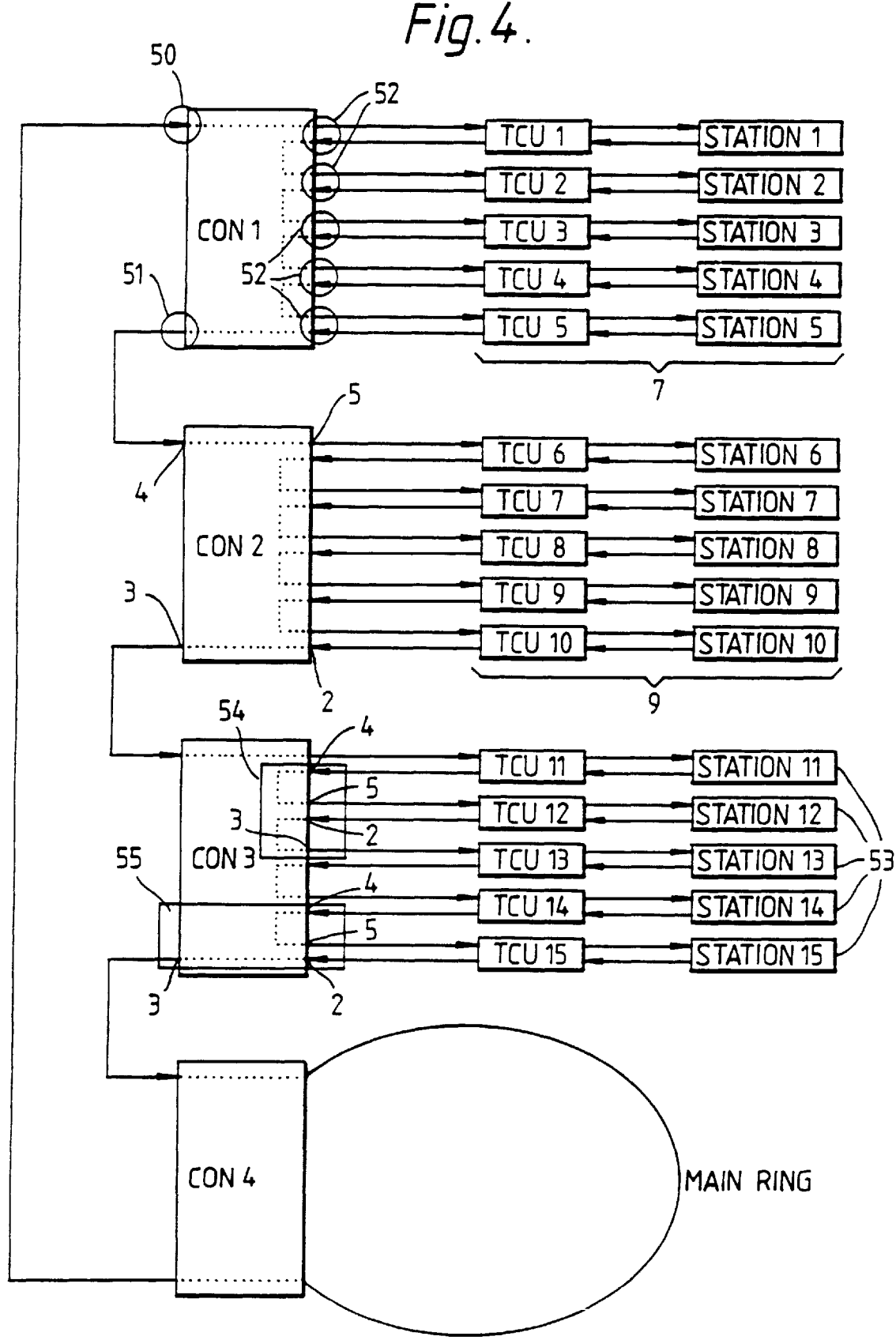
FIG. 4 illustrates the application of the form of the invention to which FIGS. 2 and 3 relate to a more complex network structure.

FIG. 4 will be recognised as a logical/wiring diagram for a ring network with at least some of the user stations connected to the ring via concentrators CON1, CON2, CON3. In the usual terminology for the description of concentrator functions, each concentrator has (as shown for CON1) a main input port 50, a main output port 51 and a series of bidirectional spur ports 52, each of which is logically (and may be physically) constituted by separate output and input ports.

In the simpler forms of application of the present invention to this type of ring layout, represented by CON2, the concentrator is, in addition to its normal functions as such, a security unit as defined with the ports 2, 3, 4 and 5 in the positions shown.

In a more developed form of the invention, the concentrator incorporates a separate security unit as defined for each of the stations connected to it, as illustrated for stations 53 connected by CON3. To avoid confusion, only two of the security units 54 and 55, being those for the second and the last of the stations 53, have been shown, along with the positions of their ports 2 to 5. In fact there are five security units incorporated into this concentrator, so that for instance the ports shown as ports 2 and 3 of security unit 54 also constitute the ports 4 and 5 of the next security unit. In fact there may be a sixth security unit incorporated into CON3, corresponding exactly to the one incorporated into CON2.

Figure 5B:
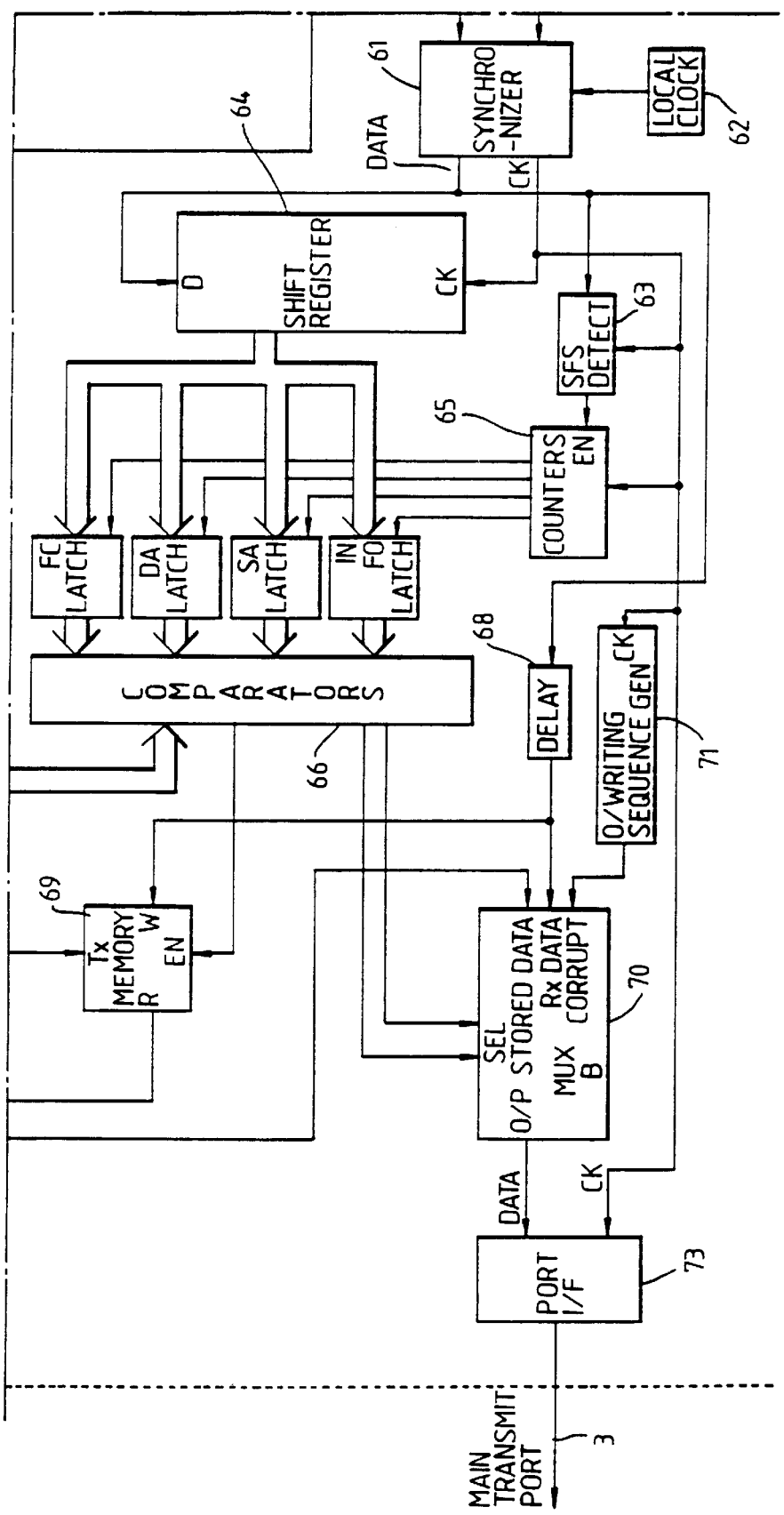
Figure 5C:
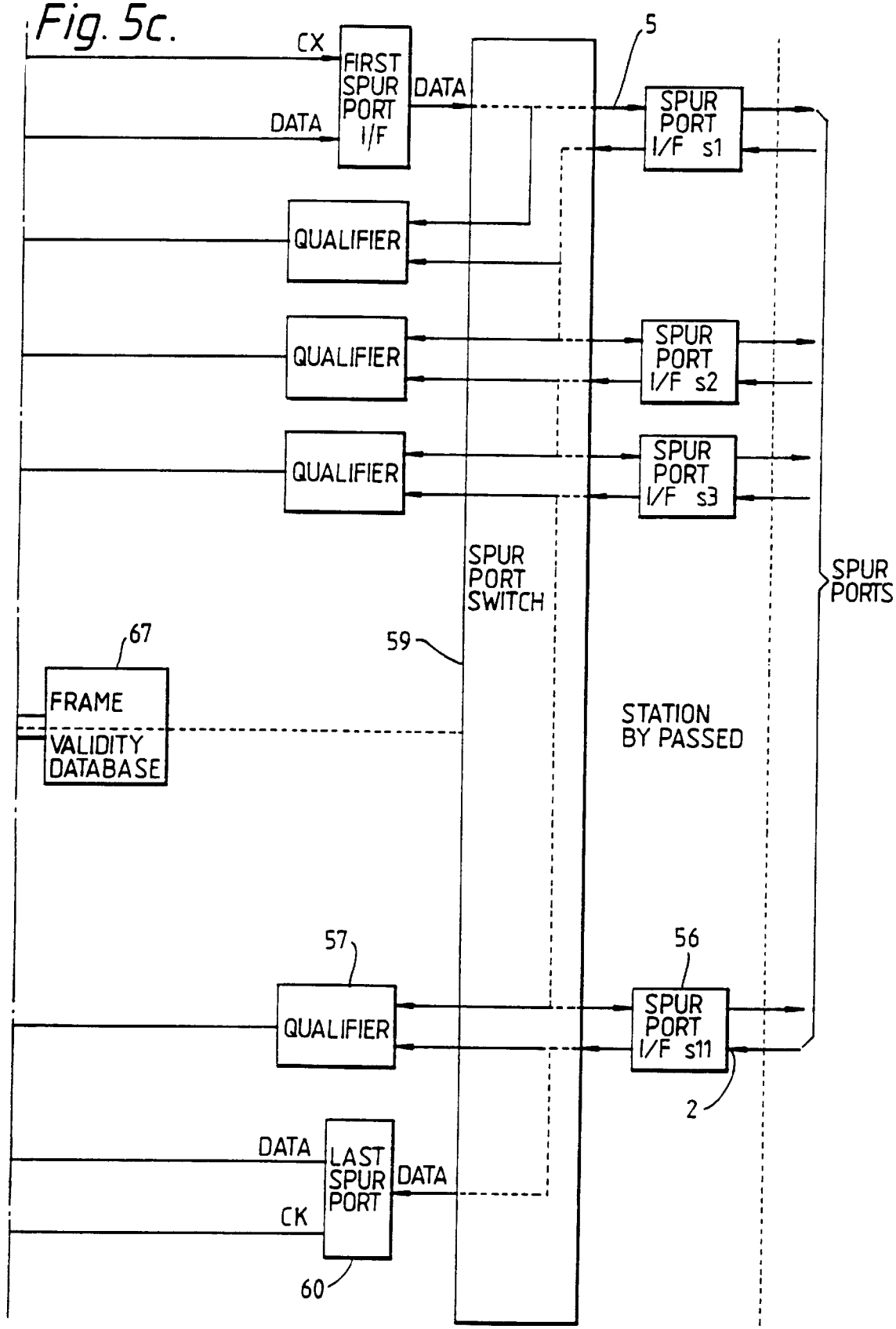

FIG. 5 is a block circuit diagram of a simple combined concentrator and security unit, such as CON2 in FIG. 4. The upper and lower halves of the diagram, corresponding in essence to logic 10 and logic 13 respectively in FIG. 1, are physically identical (though as already described the logical decisions they make differ somewhat) and only the lower part of the circuit dealing with frames arriving at the first input port 2 will be described. The incoming signal is received by a spur port circuit 56 which is entirely conventional, and activity on the port is reported by a qualifier 57 to memory read control 58 in order to permit proper control of sequencing by the spur port switch 59. The received data is passed to a circuit block 60 which separates data frames from syncronisation signals and thence to a syncroniser 61 whosed function is to establish syncronism between the incoming data pulses and the local clock 62. From here, the data is passed to a start-of-frame detector 63 and both the data an the syncronisation signals are passed separately to a shift register 64 which (under the control of counter 65 switched by the start-of-frame detector 63), extracts destination address and source address segments from the frames, as well as any other segments of the frame that may need to be analysed. These segments are then made available to comparators 66 having access to a data base 67 which contains information identifying the source addresses and destination addresses of the stations connected to this concentrator (its security group) together with whatever authorisation rules may be required.

To allow time for the operation of the comparators, the incoming data is passed through a delay circuit 68 before application both to a FIFO memory 69 and a multiplexer 70. In addition to its input from the delay circuit 68, multiplexer 70 receives inputs from a modifying sequence generator 71 and from a second FIFO memory 72 which corresponds to FIFO 69 in the other half of the circuit. Memory 69 is enabled, or not enabled, and multiplexer 70 is switched between its respective inputs according to the logical decisions made by comparators 66, so as to feed to the output port circuit 73 the original frame (from 68), a modified frame (with data segment taken from 71) or a reconstructed frame (read wholly or at least as to its data segment from 72).

Figure 6:
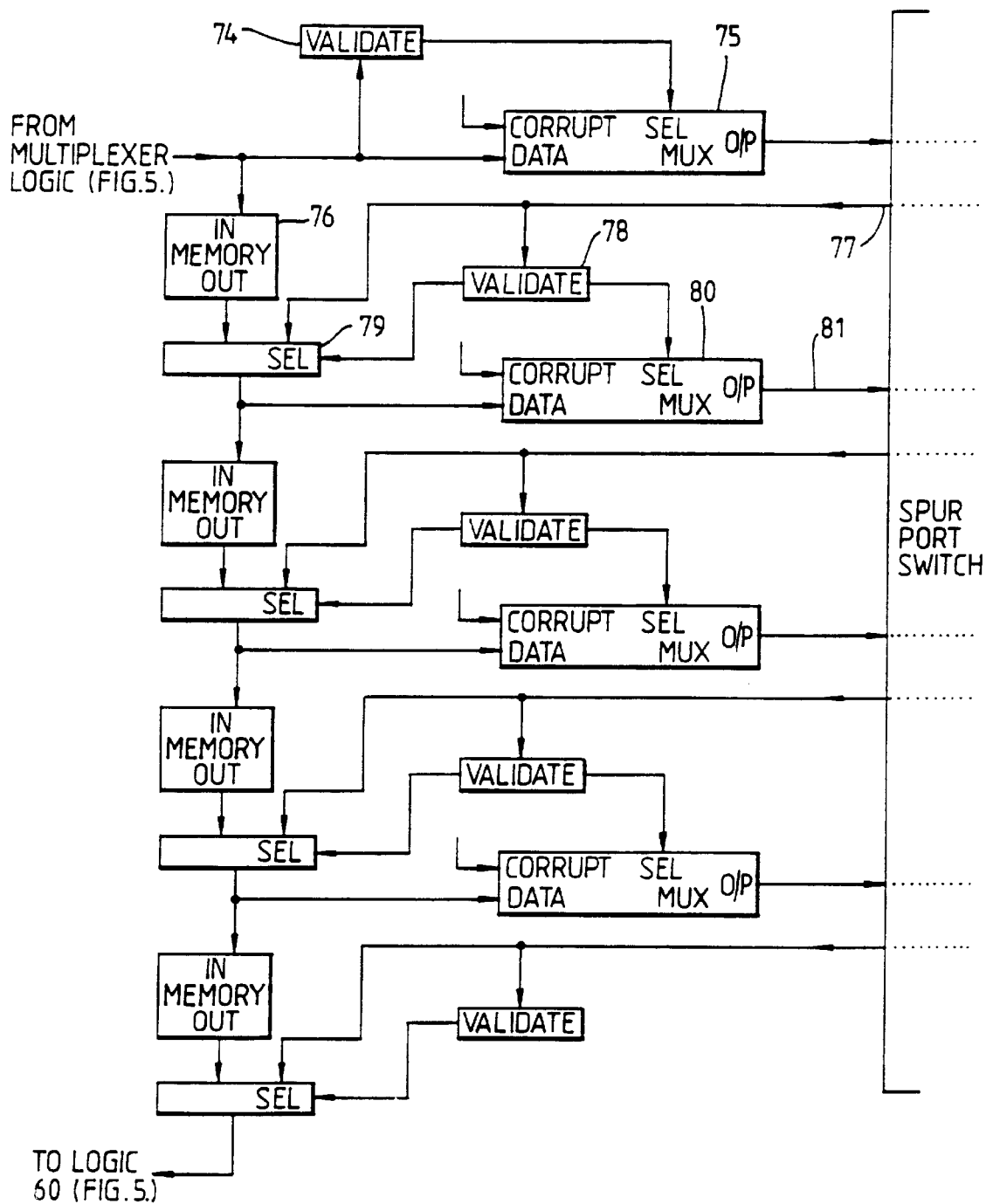
FIG. 6 is a further block diagram illustrating a still more complex and versatile form of the invention.

The elaboration of the circuit of FIG. 5 to provide all the security features of CON3 in FIG. 4 is routine but complicated electronics, and involves the insertion of large amounts of circuitry immediately to the left of the spur port switch 59 in FIG. 5; FIG. 6 is a further simplified block diagram of the additional circuitry only. The data that would, in the simple form of FIG. 5, have been passed to the output port 5 is instead passed to logic 74 controlling a multiplexer 75 and memory 76; 75 corresponds to the equivalent of multiplexer 70 in the other half of the circuit of FIG. 5, whereas 76 corresponds exactly to 72 in FIG. 5. Signals returning from the first spur port at 77 are passed to logic 78; this provides functions corresponding both to logic 10 in FIG. 1, whereby it controls multiplexer 79 to select either the frame as received at 77 or its stored equivalent from memory 76, and also corresponding to logic 13 in FIG. 1, whereby it controls the next multiplexer 80 to determine whether the forwarded frame should go in modified or unmodified form to the next output port 81. This pattern repeats for all the remaining ports.

I claim:

1. A security unit for a ring network having two pairs of ports, each pair comprising an input port for receiving data frames from the ring and an output port for forwarding data frames to the ring, so that it may be connected into the ring in two positions so as to divide the ring into a first segment downstream of the first pair of ports and a second segment downstream of the second pair of ports, each said segment containing at least one station, characterized by means for reading a part of a received data frame received at the input port of the first pair and determining in response to that part of the received data frame whether the received data frame is addressed to and/or authorized to be received by a station in the first segment; means for modifying the received data frame into a modified frame having a form in which data content of the received frame cannot be read and for forwarding the modified frame to the first output port of the first pair, instead of the received data frame, if it is not addressed to a station in the first segment or is not authorized to be received by a station in the first segment; and means for reconstructing the received data frame and transmitting the received data frame from the output port in the second pair when the modified frame is returned to the security unit by a station in the first segment.

2. A security unit as claimed in claim 1, including a memory and, in which the means for modifying modifies received frames by substituting some other data for all or at least a major part of the data contained in the received data frame while holding at least the data contained in the received data frame in the memory in the security unit; and the means for reconstructing restores the received data frame when required by reading from the memory.

3. A security unit as claimed in claim 2, the second segment of the ring constituting a single security group and in which frames addressed by one station in the security group to another station in the security group are modified by the security unit before being transmitted to the first segment of the ring.

4. A security unit as claimed in claim 3 in which the received data frame includes a destination address and the security unit reads the destination address of each received data frame at the input port of the first pair, compares the destination address with stored data identifying the station (s) connected to the first segment of the ring and forwards the received data frame if the destination address of the frame matches a stored address but otherwise forwards a modified frame.

5. A security unit as claimed in claim 3 in which the received data frame has a destination address and a source address, and the security unit reads both the destination address and the source address of each received data frame at the input port of the first pair and compares the destination address and the source address with stored data identifying stations connected to the first segment of the ring and in which the received data frame is forwarded by the output port of the first pair if either the destination address or the source address matches a station connected to the first segment of the ring but otherwise a modified frame is forwarded.

6. A security unit as claimed in claim 3 in which the received data frame has a destination address and a source address, and the security unit reads both the destination address and the source address of each received data frame and compares the destination address and the source address with the access rules indicating which sources are authorized to communicate with the station or stations connected to the first segment of the ring.

7. A security unit as claimed in claim 3 in which either or both of the first and the second segments are sub-divided by additional security units as aforesaid.

8. A security unit as claimed in claim 1 in which the first and second segments include a single station.

9. A security unit in claim 8 in which the received data frame includes a destination address and the security unit reads the destination address of each received data frame at the input port of the first pair, compares the destination address with stored data identifying the station connected to the first segment of the ring and forwards the received data frame if the destination address of the frame matches a stored address but otherwise forwards a modified frame.

10. A security unit as claimed in claim 8 in which the received data frame includes a destination address and a source address, and the security unit reads both the destination address and the source address of each received data frame at the input port of the first pair and compares the destination address and the source address with the access rules indicating which sources are authorized to communicate with the station connected to the first segment of the ring.

11. A security unit as claimed in claim 9 in which the received data frame has a destination address and a source address, and the security unit reads both the destination address and the source address of each received data frame and compares the destination address and the source address with the access rules indicating which sources are authorized to communicate with the station connected to the first segment of the ring.

12. A security unit for a ring network having two pairs of ports, each pair comprising an input port for receiving data frames from the ring and an output port for forwarding data frames to the ring, so that it may be connected into the ring in two positions so as to divide the ring into a first segment downstream of the first pair of ports and a second segment downstream of the second pair of ports, each said segment containing at least one station, characterized by a memory, means for reading a part of a received data frame received at the input port of the first pair and determining in response to that part of the frame whether the received data frame is addressed to and/or authorized to be received by a station in the first segment; means for modifying the received data frame in to a modified frame having a form in which data content of the received data frame cannot be read and for forwarding the modified frame to the output port of the first pair, instead of the received data frame, if it is not addressed to a station or is not authorized to be received by a station in the first segment; means for reconstructing the received data frame and transmitting the received data frame from the output port of the second pair when the modified frame is returned to the security unit by a station in the first segment and wherein the means for modifying modifies received data frames by substituting some other data for all or at least a major part of the data contained in the received data frame while holding at least the data contained in the received data frame in the memory in the security unit, and the means for reconstructing restores the received data frame when required by reading from the memory.

13. A security unit as claimed in claim 12, the second segment of the ring constituting a single security group and in which frames addressed by one station in the security group to another station in the security group are modified by the security unit before being transmitted to the first segment of the ring.

14. A security unit as claimed in claim 12 in which either or both of the first and the second segments are sub-divided by additional security units as aforesaid.

15. A security unit as claimed in claim 12 in which the first and second segments include a single station.

16. In a token ring local area network having at least one central controller with at least one port, each port coupling to a user station, a method for securing data on the network comprising the steps of:

(a) receiving, at a port, a data packet from the ring having at least a destination address, a source address, and a data field;

(b) storing a content of said data field at said port;

(c) examining a security qualifier portion of said data packet to determine whether said data packet is to be secured;

(d) generating a substitute bit pattern; and (e) replacing said data field content with said substitute bit pattern to form a secured data packet in response to said examining step.

17. The method for securing data on a local area network as recited in claim 16, wherein said security qualifier portion of said data packet is said destination and source addresses, said examining step comparing said destination and source addresses with an address of a station attached to said port.

18. The method for securing data on a local area network as recited in claim 16, wherein said security qualifier portion of said data packet comprises said destination address.

19. The method of securing data on a local area network as recited in claim 16, further comprising the step of transmitting said data packet unaltered if said data packet comprises a management frame.

20. The method of securing data on a local area network as recited in claim 16 further comprising the steps of:
(f) transmitting said secured data packet to an attached user station;
(g) receiving back at said port said secured data packet from said attached user station;
(h) replacing said substitute bit pattern with said content of said data field stored at step (b) to form a restored data packet; and
(i) transmitting said restored data packet onto the ring.

21. In a token ring local area network having at least one central controller with at least one port, each port coupling to a user station, a method for securing data on the network comprising the steps of:
(a) receiving at a port a data packet from the ring having at least a destination address, a source address, and a data field;
(b) storing a content of said data field at said port;
(c) comparing said destination and said source address with an address of a station attached to said port;
(d) generating a substitute bit pattern; and
(e) replacing said data field content with said substitute bit pattern to form a secured data packet if said source or destination address does not match said address of said attached station.

22. The method for securing data on a local area network as recited in claim 21 further comprising the steps of:
(f) transmitting said secured data packet to said attached station;
(g) recovering said data packet by inserting said stored data field content in place of said substitute bit pattern in a data packet received from said station; and
(h) transmitting said recovered data packet to a next port on said ring.

23. The method for securing data on a local area network as recited in claim 21, wherein said storing step stores said content of said data field in a first-in first-out fashion at a memory structure at said port.

24. In a central controller of a token ring local area network, a port circuit for providing data security on the network, comprising:

storage means coupled to receive from the ring a data packet having user data;

pattern detection means, coupled to receive from the ring a data packet having user data, said pattern detection means for comparing a destination and a source address of said data packet with an address of a station attached to the port;

pattern generator means for generating a substitute data pattern; and selection means, coupled to receive said data packet and coupled to said pattern generator means and said pattern detection means, for selecting said substitute data pattern to be transmitted to said station attached to the port if said data packet destination or source address does not match said station address.

25. A port circuit as recited in claim 24 further comprising:

second selection means, coupled to receive a data packet from said station attached to the port and coupled to said storage means, for selecting a contents of said storage means to be transmitted to a next station if said data packet includes said substitute data pattern.

26. In a central controller of a token ring local area network, a port circuit for providing data security on the network, comprising:

a pattern detector having an input for receipt from the ring of a data packet having user data and having an output, said pattern detector for comparing a destination and a source address of said data packet with an address of a station attached to the port;

storage means coupled to receive said data packet for storing said data packet;

a pattern generator for generating a substitute data pattern;

a first multiplexer having a first input for receipt of said data packet and a second input coupled to an output of said pattern generator, and a control input coupled to an output of said pattern detector, and an output coupled to said station attached to the port; and a second multiplexer having a first input coupled to an output of said storage means, a second input coupled to receive transmit data from said station attached to the port, a control input coupled to said output of said pattern detector, and an output coupled to the ring.

* * * * *